Figure 1:
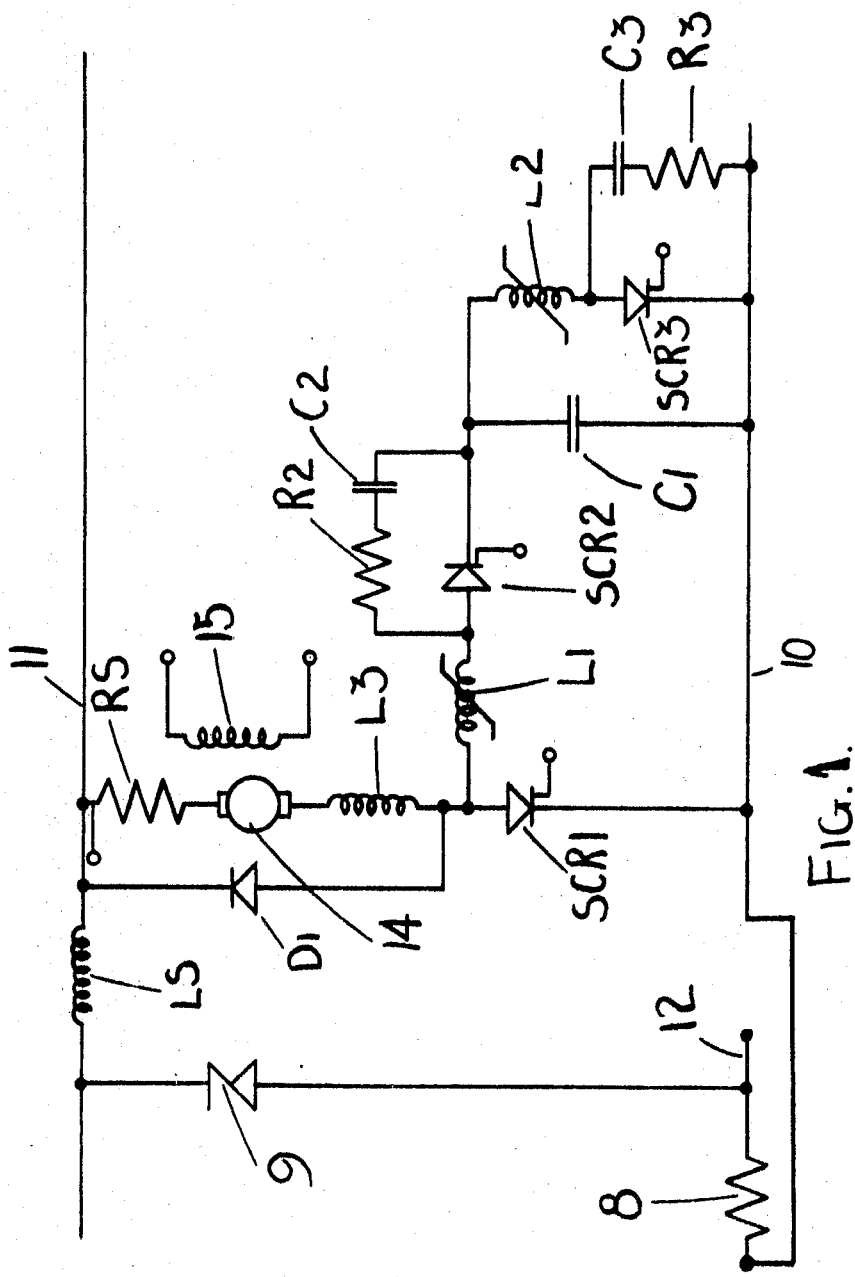

United States Patent

[11] 3,597,671

| [72] | Inventors | Derek Stanley Adams<br>Shirley, Solihull;<br>Michael Ainley Thompson, Birmingham, both of, England |
|---|---|---|
| [21] | Appl. No. | 840,674 |
| [22] | Filed | July 10, 1969 |
| [45] | Patented | Aug. 3, 1971 |
| [73] | Assignee | Joseph Lucas Industries, Limited<br>Birmingham, England |
| [32] | Priority | July 17, 1968 |
| [33] | | Great Britain |
| [31] | | 33981/68 |

[54] MOTOR SPEED SYSTEM WITH SWITCHING FREQUENCY CONTROL
8 Claims, 3 Drawing Figs.

| [52] | U.S. Cl. | 318/332, 318/341 |
|---|---|---|
| [51] | Int. Cl. | H02p 7/28 |
| [50] | Field of Search | 318/341, 332, 345, 434 |

[56] References Cited
UNITED STATES PATENTS

| 3,343,063 | 9/1967 | Keeney, Jr. et al. | 318/341 X |
| 3,389,318 | 6/1968 | Hoyt, Jr. | 318/332 X |
| 3,500,161 | 3/1970 | Domann et al. | 318/341 X |

*Primary Examiner*—Oris L. Rader
*Assistant Examiner*—Robert J. Hickey
*Attorney*—Holman & Stern ABSTRACT: An electric traction system and a drive motor, an electronic switching device in series with the motor for controlling current flow through the motor, and a switching circuit for turning the device off at a first current level in the motor and on at the second lower current level in the motor. Manually operable means varies at least one of the current levels for controlling the speed of the motor, and frequency detecting means is provided for detecting the switching frequency and adjusting at least one of the current levels independently of the manually operable means to maintain the switching frequency below a predetermined value.

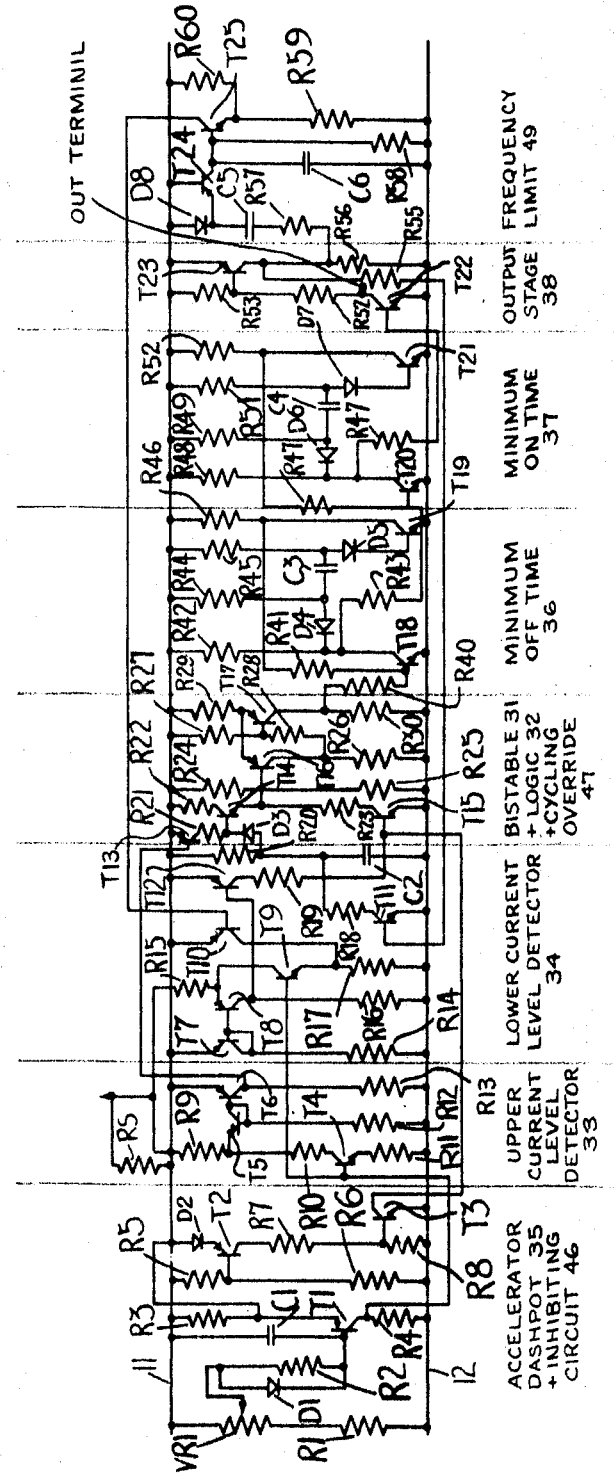

MOTOR SPEED SYSTEM WITH SWITCHING FREQUENCY CONTROL

This invention relates to electric traction systems of the kind including a drive motor, an electronic switching device in series with said motor for controlling current flow therethrough, a switching circuit for turning said device off at a first current level in said motor and for turning said device on at a second, lower current level in said motor, and manually operable means for varying at least one of said current levels to control the speed of the motor.

According to the invention, a system of the kind specified includes frequency detecting means for detecting the switching frequency of said device and adjusting at least one of said current levels, independently of the manually operable means, to maintain the switching frequency below a predetermined value.

In systems of the kind specified, the use of a motor which has a low armature time constant, for example a shunt wound motor, can lead to difficulties in that the switching frequency which is demanded by the motor can become so high that the electronic switching device (which typically is a thyristor) and other devices used in the system, cannot respond rapidly enough. It is possible to avoid excessive frequencies of this sort by choosing the current levels sufficiently far apart to ensure that the switching frequency is acceptable udder all load conditions. However, there is a ripple content in the current wave form through the motor, this ripple content being at the switching frequency, and if the levels are chosen far apart, the amplitude of the ripple current is excessive under most load conditions. The invention enables the current levels to be chosen sufficiently close together to avoid excessive ripple current amplitude, but at the same time excessive frequencies leading to difficulties with the thyristor or other electronic switching device are avoided by the automatic changing of at least one of the current levels when necessary.

Figure 2:
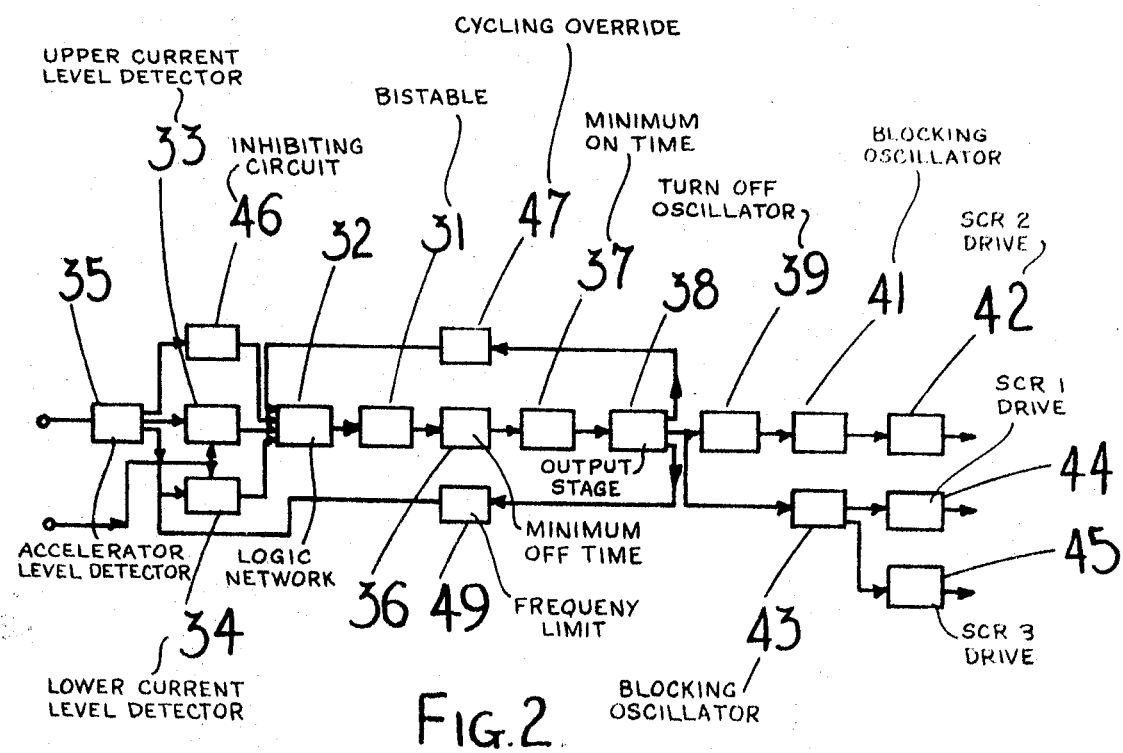

An example of the invention is illustrated in the accompanying drawings, in which:

FIG. 1 is a circuit diagram of the motor control circuit,
FIG. 2 is a block diagram of the control system associated with FIG. 1, and
FIG. 3 is a circuit diagram illustrating most of the circuits indicated in FIG. 2.

Referring to FIG. 1, there are provided positive and negative supply lines 11, 10 connected to the terminals of a vehicle battery and a further negative line 12 which in use is connected to the negative battery terminal through a resistor 8. The voltage between the line 11, 12 is stabilized by a Zener diode 9. Connected in series between the lines 11, 10 are a resistor RS, the armature 14 of a traction motor, an inductor L3 and a thyristor SCR1, the resistor RS, armature 14 and inductor L3 being bridged by a freewheel diode D1. The field winding of the motor, which is shunt wound, is indicated at 15, and the inductor LS in the line 11 indicates the stray inductance of the leads to the battery.

Connected in series across the thyristor SCR1 is a saturable inductor L1, a thyristor SCR2 and a capacitor C1, the thyristor SCR2 being bridged b a resistor R2 and capacitor C2 in series. The capacitor C1 is itself bridged by a second saturable inductor L2 and a third thyristor SCR3, which in turn is bridged by a capacitor C3 and resistor R3. The components R2, C2 and C3, R3 are employed to protect the thyristors SCR2 and SCR3 in known manner.

In use, assuming for the moment that the capacitor C1 is not charged and the thyristor SCR 2 is turned on, then current flows through the series path RS, 14, L3, L1 and SCR2 to charge the capacitor C1. When the capacitor C1 has charged, the current flowing through the thyristor SCR2 falls to zero, and so the thyristor turns off. At a later point in the cycle, the thyristor SCR1 is fired, and full motor current flows. The thyristor SCR3 is fired after the thyristor SCR2 turns off, conveniently, at the same time as the thyristor SCR1, and reverses the charge on the capacitor C1. At the end of the cycle, the thyristor SCR2 is fired again, and the reverse bias on the capacitor C1 is applied to the thyristor SCR1 to turn it off, after which the capacitor C1 charges again and the cycle recommences.

The purpose of the inductor L3 is to limit the rate of rise of current in the motor. This inductor is not normally required if the motor is series wound. The resistor RS provides an input to the control circuit for determining the instants at which the thyristors are fired. The inductor LS increases the charge on the capacitor C1 to a value above battery voltage, so ensuring that the thyristor SCR1 will be turned off.

At the instant when the thyristor SCR2 is fired, then assuming for the moment that the inductor L1 was not present, current would build up in the thyristor SCR2 rapidly. Moreover, at the instant of switching, the voltage across the thyristor SCR2 is high, and so the thyristor SCR2 will experience high voltage and current conditions simultaneously. The saturable inductor L1 is included to limit the rate of rise of current until the inductor saturates. During this delay period, the voltage across the thyristor SCR2 falls, and so the presence of the inductor L1 avoids simultaneous high current and voltage conditions across the thyristor SCR2. The saturable inductor L2, as well as acting as a ringing choke, performs a precisely similar function for the thyristors SCR3.

Referring now to FIG. 3 the positive and negative supply lines 11, 12 correspond to those in FIG. 1, and connected between them in series is a variable resistor VR1 and a resistor R1. A variable point on the resistor VR1 is connected through a resistor R2 and diode D1 in parallel to the base of a PNP transistor T1 the base of which is also connected to the line 11 through a capacitor C1, and the collector of which is connected to the line 12 through a resistor R4. The emitter of the transistor T1 is connected to the line 11 through a resistor R3, and is further connected through a diode D2 to the emitter of a PNP transistor T2, having its base connected to the lines 11, 12 through resistors R5, R6 respectively, and its collector connected to the line 12 through resistors R7, R8 in series. The junction of the resistors R7, R8 is connected to the base of an NPN transistor T3 having its emitter connected to the line 12.

The collector of the transistor T1 is further connected to the base of an NPN transistor T4, and to the base of an NPN transistor T9. The transistor T4 has its emitter connected to the line 12 through a resistor R11, and its collector connected through resistors R10, R9, R15, in series to the collector of the transistor T9, the emitter of which is connected through a resistor R17 to the line 12. The junction of the resistors R9, R15 is connected to the line 11 through the resistor RS seen in FIG. 1, and the junction of the resistors R9, R10 is connected to the emitter of a PNP transistor T5, the transistor T5 having its base connected to the line 12 through a resistor R12, and its base and collector interconnected and connected to the base of a PNP transistor T6, the emitter of which is connected to the line 11 and the collector of which is connected through a resistor R13 to the line 12.

The collector of the transistor T9 is connected to the emitter of a PNP transistor T8, the collector of which is connected through a resistor R16 to the line 12 and the base of which is connected to the base of a PNP transistor T7. The transistor T7 has its emitter connected to the line 11 and its base and collector interconnected and connected to the line 12 through a resistor R14. The emitter of the transistor T9 is further connected to the collector of the PNP transistor T10, the emitter of which is connected to the line 11.

The collector of the transistor T8 is connected to the base of a PNP transistor T12 the emitter of which is connected to the line 11, and the collector of which is connected through a resistor R19, to the base of an NPN transistor T15, the emitter of which is connected to the line 12. The collector of the transistor T15 is connected through a resistor R23 to the emitter of a PNP transistor T14, the collector of which is connected to the line 11 through a resistor R22 and the base of which is connected through a resistor R21 to the collector of a PNP transistor T13 with its emitter connected to the line 11, and its base connected to the collector of the transistor T6. The base of the transistor T14 is further connected through a diode D3 to the junction of a resistor R20 and capacitor C2 connected in series across the lines 11, 12, this junction further being connected through a resistor R18 to the collector of an NPN transistor T11 having its emitter connected to the line 12.

The emitter of the transistor T14 is further connected to the base of a PNP transistor T16, the base being connected to the lines 11, 12 through resistors R24 and R25 respectively. The collector of the transistor T16 is connected to the line 12 through a resistor R26, and is further connected through a resistor R28 and resistor R27 in series to the line 11, the junction of the resistors R28 and R27 being connected to the base of the PNP transistor T17, the collector of which is connected to the line 12 through a resistor R30. The emitters of the transistors T16, T17, are connected through a resistor R29 to the line 11. The collector of the transistor T17 is further connected through a resistor R40 to the base of an NPN transistor T18 with its emitter connected to the line 12 and its collector connected through a resistor R42 to the line 11. The collector of the transistor T18 is further connected through a diode D4 and a resistor R44 to the line 11, the junction of the diode D4 and resistor R44 being connected through a capacitor C3 to the junction of a resistor R45 and diode D5 connected in series between the line 11 and the base of an NPN transistor T19, the emitter of which is connected to the line 12 and the collector of which is connected through a resistor R46 to the line 11, he collector of the transistor T19 further being connected through a resistor R41 to the base of the transistor T18.

The collector of the transistor T18 is further connected through a resistor R43 to the base of an NPN transistor T20 having its emitter connected to the line 12 and its collector connected through a resistor R48 to the line 11. The collector of the transistor T20 is further connected through a diode D6 and a resistor R49 in series with the line 11, the junction of the resistor R49 and diode D6 being connected through a capacitor C4 to the junction of a resistor R51 and diode D7 connected in series between the line 11 and the base of an NPN transistor T21, the emitter of which is connected to the line 12 and the collector of which is connected to the resistor R52 to the line 11, and through a resistor R47 to the base of the transistor T20. A further connection from the collector of the transistor T20 is taken through a resistor R50 to the base of an NPN transistor T22, the emitter of which is connected to the line 12, and the collector of which is connected to an output terminal A, and is further connected through resistors R54 and R53 in series to the line 11, the junction of resistors R54 and R53 being connected to the base of a PNP transistor T23, the emitter of which is connected to the line 11, and the collector of which is connected to the line 12 through a resistor R56. The collector of the transistor T23 is further connected through a resistor R55 to the base of the transistor T11, and through a resistor R57 and capacitor C5 in series to the emitter of a PNP transistor T24, the base of which is connected to the line 11, the emitter of which is connected to the line 11 through a diode D8, and the collector of which is connected to the line 12 through a capacitor C6 and resistor R58 in parallel, and also connected to the base of an NPN transistor T25. The transistor T25 has its emitter connected to the line 12 through a resistor R59 and to the line 11 through a resistor R60, and its collector connected to the base of the transistor T10.

Turning now to FIG. 2, the operation of the circuit will be explained briefly in relation to the block diagram, and the various blocks will then be identified with the circuit diagram in FIG. 3 and the detailed operation explained. The circuit is basically designed to operate so that the current level in the motor 14 varies between an upper limit and a lower limit, the upper and lower limits being adjusted by the accelerator pedal of the vehicle. The circuit indicated in FIG. 2 includes a bistable circuit 31 which produces a square wave output controlled by a logic network 32, which in turn receives inputs from an upper current level detector 33, and a lower current level detector 34. The upper and lower currents are set by the pedal, through the intermediary of a circuit termed an accelerator dashpot 35, and the feedback signal from the resistor RS determines the instant at which the circuits 33 and 34 operate the bistable circuit 31. The output from the bistable circuit 31 is passed through minimum off and on time limit circuits 36 and 37, the purpose of which will be explained later, to an output stage 38 which basically provides a square wave output, the leading edge of which is produced when the current in the motor has an upper predetermined value and the trailing edge of which is produced when the current has a lower predetermined value. The leading edge of the output wave form operates through a turn off oscillator 39, a blocking oscillator 41 and a drive circuit 42, all of conventional form and therefore not described, to fire the thyristor SCR2 in FIG. 1 and turn the main thyristor SCR1 off. The trailing edge of the pulse operates through a blocking oscillator 43 to operate two drive circuits 44 and 45 for firing the thyristors SCR1 and SCR3 respectively to initiate flow of motor current and to reverse the charges in the capacitor C1 as previously explained.

The output of the bistable circuit 31 i also affected by two further input signals, one from an inhibiting circuit 46, and one from what is termed a cycling override circuit 47, the purpose of both the circuits being explained later. Additionally a signal from the output stage 38 is fed to a frequency limiting circuit 49 which adjusts the circuit 34 to restrict the frequency to a level which is acceptable by the thyristors. It would of course be possible to arrange for the circuit 49 to adjust the circuit 34, or both circuits 33, 34.

The various parts of the circuit will now be explained in more detail.

Bistable Circuit 31

This circuit is a conventional Schmitt bistable circuit including the transistors T17 and T16 with their common emitter resistor R29. The circuit is operated by inputs to the base of the transistor T16 and produces a square wave output at the collector of the transistor T17.

Logic Network 32

The logic network consists of a number of transistors, for example the transistors T14 and T15, which control the base voltage of the transistor T16. The precise nature of this network will become apparent when considering the remaining circuits.

Upper and Lower Limit Detectors 33 and 34

The upper and lower limit detectors are similar circuits, and include respectively transistors T4 and T9 the conduction levels of which are determined by the accelerator pedal so that there is established across the resistors R9 and R15 a voltage representing the upper and lower current limits set by the pedal. These voltages are compared with the voltage across the resistor RS, and when the armature current rises to the level corresponding to the voltage across the resistor R9, the transistor T6, which normally conducts, is turned off, so that current can flow through the resistor R13 to turn on the transistor T13, which in turn turns on the transistor T14, so that the base current flowing to the transistor T16 through the resistor R25 is diverted through the transistor T14, thereby turning the transistor T14 off and the transistor T17 on. When the armature current is falling, a point is reached at which the transistor T8 turns off, and at this point current flowing through the resistor R16 turns the transistor T12 on, so providing base current to the transistor T15, which turns on to turn the transistor T16 on and the transistor T17 off. Thus, the output at the collector of the transistor T17 is a square wave the leading edge of which represents the point at which the upper current level is reached and the trailing edge of which represents the point at which the lower current level is reached.

Accelerator Dashpot 35

The accelerator pedal controls the variable resistor VR1 which sets the base voltage of the transistor T1, the collector current of which provides the base current to the transistors T4 and T9 so as to set the voltage across resistors R9 and R15. When the accelerator pedal is not depressed, the slider is at the potential of the line 11, and as the accelerator pedal is depressed the potential approaches that of the line 12, so increasing the collector current of the transistor T1. The effect of the rapid movement of the accelerator pedal is damped by the capacitor C1, which must charge through the resistor R2 before the effect of moving the accelerator pedal is felt. Thus, however quickly the accelerator pedal is moved, acceleration is achieved only at a predetermined rate. If the rate is not controlled, it is possible for a demand in current to be made so rapidly in the arrangement shown in FIG. 1 that commutating cannot reliably be achieved.

Minimum On and Off Times 37 and 36 and Output Stage 39

The output from the transistor T17 is a square wave the leading edge of which coincides with the upper current level being reached and the trailing edge of which corresponds with the lower current level being reached. When the transistor T17 turns on, the transistor T18 turns on so removing base current from the transistor T20, and allowing current to flow through resistors R48 and R50 to turn on the transistor T22. When the transistor T17 turns off, the transistor T18 turns off, the transistor T20 is turned on by current flow through resistors R52 and R47, so that no further current flows through resistor R50 and the transistor T22 turns off. In other words, the transistor T22 operates in sympathy with the transistor T17, and provides a square wave output at the output terminal marked in FIG. 3 which is employed as described with reference to the block diagram to control the thyristors. In other words, the output at the output terminal marked in FIG. 3 provides inputs to the turn off oscillator 39 and the blocking oscillator 43 which as shown in FIG. 2. These components then operate the drive circuits 42, 44 and 45 as described with reference to FIG. 2. The detailed arrangements of the particular components are not shown, since they are well known and are commonly used in the general type of thyristor circuits with which the invention is concerned.

With the arrangement thus far described, under certain conditions of motor speed and accelerator pedal setting, either the on period of the thyristor SCR1 or its off period could fall to such a value that the various processes which must take place in FIG. 1 do not have time to do so. Thus, with the thyristor SCR1 off, the firing pulse to turn it on again must be delayed for at least long enough for the capacitor C1 to charge. With the thyristor SCR1 on, the firing pulse for turning it off again must be delayed at least sufficiently long for the charge on the capacitor C1 to be reversed. The minimum off and on circuits, which are similar, are provided to ensure that the on and off periods cannot fall below these minimum values. When the transistor T17 turns on, the transistor T18 also turns on and causes the capacitor C3 to bias the base of the transistor T19 so that the transistor T19 is held off for a period of time during which the capacitor C3 recharges by way of resistor R45 to a level at which the transistor T19 can conduct again. As long as the transistor T19 is off, the transistor R18 is held on by current flow through resistors R46 and R41, and so if the transistor T17 turns off again before the end of the minimum off period, the transistor T18 will still be held on, the transistor T20 still being off and the transistor T22 still being on. Similarly, when the transistor T17 turns off and the transistor T20 turns on, the capacitor C4 holds the transistor T21 off, and the the transistor T20 is held on by current flow through resistor R47 until the capacitor C4 charges through resistor R49. Thus, even if the transistor T17 turns on again, with consequential turning on of the transistor T18, the transistor T20 will stay on for the predetermined period of time, and will hold the transistor T22 off.

It will be noted that if the minimum on time circuit is in operation, the transistor T18 will be turned on so that the capacitor C3 can start charging before the transistor T22 switches. In other words, if the minimum on circuit is working the minimum off period will be effectively reduced, and vice versa. This does not matter, because the minimum on circuit and the minimum off circuit will never be required to operate at the same time.

Frequency Limit Circuit 49

The purpose of the frequency limit circuit is to restrict the switching frequency to a value such that the thyristors will operate satisfactorily. The output state includes a transistor T23 which receives its base current by way of the transistor T22 and so turns on and off at the same time as the transistor T22. The output from the collector of the transistor T23 is fed to a conventional diode-transistor pump, to develop a voltage across the capacitor C6 which is dependent on the frequency of switching. This voltage is applied to the transistor T25, the collector current of which will be dependent on the switching frequency. The collector current is applied to the base of the transistor T10 which supplies current to the resistor R17. The arrangement is such that the total current flowing through the resistor R17 is constant, and so when current flows through the resistor R17 from the transistor T10, the collector current of the transistor T9 is reduced by the amount of current flowing through the transistor T10, assuming a given throttle setting. Thus, as the frequency rises, a point is reached at which the transistor T25 will start to conduct, this point being determined by resistors R59 and R60. Above this point, which corresponds to a predetermined frequency, further increase in frequency causes the transistor T10 to conduct, and it effectively reduces the lower level setting, thereby reducing the frequency.

Cycling Override 47

In the arrangement shown in FIG. 1, the back e.m.f. of the armature increases with motor speed, and so the rate of rise of armature current is reduced. Under certain load conditions, it is possible for the current flowing through the armature to reach a level which is substantially constant for a given throttle setting but which is less than the current demanded by that throttle setting. In such a case, the thyristor SCR1 will remain on indefinitely, which is undesirable because the charge on the capacitor C1 can leak away, so that when eventually conditions change and it is desired to turn the thyristor SCR1 off, the capacitor C1 will fail to do so. The cycling override circuit is designed to prevent this possibility by simulating the effect of the upper current requirement having been reached, even though it has not in fact been reached. Referring to FIG. 3, the transistor T11 is held on whenever the transistors T22 and T23 are on, so holding the capacitor C2 discharged. When the transistors T22 and T23 turn off, which represents the lower current level having been reached, the capacitor C2 starts to charge through the resistor R20. In normal circumstances, the charging of the capacitor C2 has no effect, because the transistors T22 and T23 are turned on again to discharge it. However, when the circumstances mentioned above occur, the capacitor C2 charges sufficiently to forward bias the diode D3 and turn the transistor T14 on, thereby turning the transistor T17 on in the same way as when the upper current level is reached.

Inhibit Circuit 46

When the circuit is initially turned on with the accelerator pedal in the zero position, it is essential that the thyristor SCR2 should be the first to be fired, so that the capacitor C1 will be charged and commutating will take place. The purpose of the inhibit circuit is to maintain the overall system in a condition in which pulses are applied to the thyristor SCR2 until the accelerator pedal reaches a predetermined setting. Before this setting is reached the transistor T2 is held on and provides base current to the transistor T3 to turn it on and so short circuit the base emitter of the transistor T15, which therefore remains off irrespectively of whether the transistor T12 turns on or not. Because the transistor T15 is held off, there is time for the voltage across the capacitor C2 to build up to a value at which it turns the transistor T14 on, which turns the transistor T17 on to hold the system in a state at which the transistor T22 is conducting and operating the oscillator 39 shown in FIG. 2. The oscillator 39 provides pulses through the oscillator 41 and drive circuit 42 to the thyristor SCR2 to maintain the capacitor C1 fully charged. Thus, if the circuit is turned on but the driver does not press the accelerator pedal immediately, the thyristor SCR2 will still be fired at intervals determined by the oscillator 39. When the accelerator pedal is depressed, the predetermined setting is reached to which transistors T2 and T3 turn off, and the circuit then operates in the normal manner.

Having thus described our invention what we claim as new and desire to secure by Letters Patent:

1. An electric traction system comprising in combination a drive motor, an electronic switching device, means connecting said switching device in series with said motor for controlling current flow through said motor, current-sensing means associated with said motor for detecting the level of current flow therethrough, a switching circuit coupled to said current-sensing means and operable to turn said switching device off at a first current level in said motor and to turn said switching device on at a second, lower current level in said motor, whereby said device switches at a frequency dependent on said first and second current levels, manually operable means for varying at least one of said current levels to control the speed of the motor, and also very said switching frequency, and frequency-detecting means for detecting the switching frequency of said device and adjusting at least one of said current levels, independently of the manually operable means to maintain the switching frequency below a predetermined value.

2. A system as claimed in claim 1 in which the switching device is a thyristor and the switching circuit includes a second thyristor and a capacitor connected in series across the first mentioned thyristor, the capacitor charging through the second thyristor when the second thyristor conducts and the second thyristor turning off when the capacitor is charged, means being provided for reversing the charge across said capacitors when the second thyristor is off and the first thyristor being turned on by a pulse at its gate and off by a pulse at the gate of the second thyristor.

3. A system as claimed in claim 2 in which the frequency-detecting means modifies the action of said switching circuit to reduce the lower current level.

4. A system as claimed in claim 2 in which the manually operable means operates the switching circuit through a contact network which controls acceleration to ensure satisfactory switching of the thyristors.

5. A system as claimed in claim 2 including means for limiting the minimum off period of the first thyristor to a value sufficient to enable the capacitor to charge and the second thyristor to turn off.

6. A system as claimed in claim 2 including a third thyristor and an inductor connected across the capacitor, a third thyristor being fired at the same time as the first thyristor to reverse the charge across the capacitor, and the system including means for limiting the minimum on time of the first thyristor to a value sufficient to enable the charge on the capacitor to reverse and the third thyristor to turn off.

7. A system as claimed in claim 2 including timing means which commences operation when the first thyristor is turned on, and a simulates the effect of attaining the upper current level in conditions where the upper current level cannot be attained.

8. A system as claimed in claim 2 including means operable on initial movement of the manually operable means for supplying firing pulses to the second thyristor only, to ensure that the capacitor is charged.